(12) United States Patent
Racineux et al.

(10) Patent No.: US 12,521,781 B2
(45) Date of Patent: Jan. 13, 2026

(54) INDUCTION FORMING DEVICE COMPRISING AN INDUCTOR CONFIGURED TO DEFORM BY INDUCTION A PORTION OF AN ELECTRICALLY CONDUCTIVE PART, AND DEFORMING METHOD IMPLEMENTED BY SUCH A DEVICE

(71) Applicant: AIRBUS ATLANTIC, Rochefort (FR)

(72) Inventors: Guillaume Racineux, Chateau Thebaud (FR); Didier Priem, La Chapelle sur Erdre (FR); Emmanuel Bon, Héric (FR); Cheikh Sow, Gif sur Yvette (FR)

(73) Assignee: STELIA AEROSPACE, Rochefort (FR)

( * ) Notice: Subject to any disclaimer, the term of this patent is extended or adjusted under 35 U.S.C. 154(b) by 835 days.

(21) Appl. No.: 17/619,780

(22) PCT Filed: Jun. 18, 2020

(86) PCT No.: PCT/EP2020/067048
§ 371 (c)(1),
(2) Date: Dec. 16, 2021

(87) PCT Pub. No.: WO2020/254541
PCT Pub. Date: Dec. 24, 2020

(65) Prior Publication Data
US 2022/0355360 A1 Nov. 10, 2022

(30) Foreign Application Priority Data
Jun. 18, 2019 (FR) ........................... 1906534

(51) Int. Cl.
*B21D 26/14* (2006.01)
(52) U.S. Cl.
CPC ................... *B21D 26/14* (2013.01)

(58) Field of Classification Search
CPC . B21D 26/14; C21D 1/42; H05B 6/02; H05B 6/101; H05B 6/06; H05B 6/10; H05B 6/36; H05B 6/44
(Continued)

(56) References Cited

U.S. PATENT DOCUMENTS 3,794,805 A 2/1974 Rudd
6,137,094 A * 10/2000 Kistersky ............... B21D 26/14
219/672
2005/0229377 A1 * 10/2005 Bradley ............... B21D 39/021
29/715

FOREIGN PATENT DOCUMENTS

WO WO 2018/134271 A1 7/2018

OTHER PUBLICATIONS

Search Report from the French Intellectual Property Office on corresponding FR application (FR1906534) dated Mar. 17, 2020.
(Continued)

*Primary Examiner* — Christopher L Templeton
*Assistant Examiner* — Teresa A Guthrie
(74) *Attorney, Agent, or Firm* — Alumen IP Law PC (57) ABSTRACT

The induction moulding device comprises an inductor configured to deform by induction a portion of an electrically conductive part, the inductor comprising a first power terminal, a second power terminal and at least one inductive portion electrically connecting the first power terminal and the second power terminal, the inductive portion being intended to induce an induced current in the electrically conductive part, the inductive portion extending in a longitudinal direction in which a supply current is intended to flow between the first power terminal and the second power terminal, the inductive portion comprising at least one notch defining a narrowing of a cross section of the inductive portion perpendicular to the longitudinal direction.

16 Claims, 11 Drawing Sheets

(58) Field of Classification Search
USPC ............ 72/56; 29/419.2; 219/602, 660, 662, 219/671, 672, 674
See application file for complete search history.

(56) References Cited

OTHER PUBLICATIONS

International Search Report and Written Opinion on corresponding PCT application (PCT/EP2020/067048) from International Searching Authority (EPO) dated Oct. 20, 2020.

* cited by examiner

INDUCTION FORMING DEVICE COMPRISING AN INDUCTOR CONFIGURED TO DEFORM BY INDUCTION A PORTION OF AN ELECTRICALLY CONDUCTIVE PART, AND DEFORMING METHOD IMPLEMENTED BY SUCH A DEVICE

FIELD OF ART

The present invention relates to an induction forming device comprising an inductor configured to inductively deform a portion of an electrically conductive part. The present invention also relates to a method for deforming the portion of the part.

More particularly, the present invention relates to the field of magnetoforming, especially forming of parts for the aeronautical field.

BACKGROUND

Forming devices for deforming parts, such as metal sheets, are already known in the state of the art. Such devices are configured to implement an elastoforming method, for example a Guerin method.

These forming devices comprise, for example, a die and a rubber block. These devices are configured to deform the part by a mechanical force applied to the part when the rubber block and the die are brought together.

To increase the speed of forming parts and thus frequency of production, induction forming devices are known. These devices comprise an inductor in which a current is to flow in order to generate an electromagnetic field. The electromagnetic field is to induce a current in a portion of an electrically conductive part so that Lorentz forces are generated. These Lorentz forces are likely to deform the portion of the electrically conductive part. The portion is, for example, a flanged edge of the electrically conductive part.

However, the resulting shape of the flanged edges of the electrically conductive part is not entirely satisfactory, especially because of inhomogeneous deformations of this flanged edge. For example, the aforementioned devices are less likely to deform some portions of the flanged edge than other portions of the flanged edge.

SUMMARY

It is therefore a purpose of the invention to provide a forming device for achieving improved deformation of electrically conductive parts, while maintaining a short forming time.

To this end, one object of the invention is to provide an induction forming device comprising an inductor configured to inductively deform a portion of an electrically conductive part, the inductor comprising a first supply terminal, a second supply terminal and at least one inductive portion electrically connecting the first supply terminal and the second supply terminal to each other, the inductive portion being to induce an induced current in the electrically conductive per, the inductive portion extending in a longitudinal direction along which a supply current is to flow between the first supply terminal and the second supply terminal, the inductive portion comprising at least one notch defining a narrowing of a transverse cross-section of this inductive portion, perpendicularly to the longitudinal direction.

The forming device according to the invention makes it possible to adapt distribution of an induced current in the electrically conductive part. Indeed, notches make it possible, for example, to increase the current intensity in the ends of the inductive portion and thus to induce a high amount of current in ends of an edge to be deformed of the electrically conductive part. Besides, by virtue of induction forming, the forming time is very short.

Thus, the forming device allows better deformation of electrically conductive parts, while keeping the forming time short.

The forming device according to the invention may comprise one or more of the following characteristics, taken alone or according to any technically possible combination:

- each inductive portion longitudinally extends between a first end and a second end, the first end being spaced by a first distance from the second end, the notch being positioned at a second distance from either the first end or the second end, the second distance being lower than 20% of the first distance;
- the notch extends, transversely to the longitudinal direction, to a depth of at least 40% of a transverse dimension of the inductive portion;
- the inductive portion comprises at least two notches;
- the notches are symmetrical to each other with respect to a median plane of the inductive portion;
- the inductive portion has a height extending along a vertical direction perpendicular to an upper surface of the inductor, the upper surface being to support the electrically conductive part, the height being variable along the longitudinal direction;
- the height is variable along a transverse direction perpendicularly to the longitudinal direction and to the vertical direction;
- the inductor comprises at least two inductive portions, connected in series;
- the induction forming device comprises:
  a support configured to hold the inductor, and
  a die for forming a stop for the electrically conductive part.

Another object of the invention is a method for deforming a portion of an electrically conductive part, the method being implemented by an induction forming device comprising an inductor configured to inductively deform a portion of an electrically conductive part, the inductor comprising a first supply terminal, a second supply terminal and at least one inductive portion electrically connecting the first supply terminal and the second supply terminal to each other, the inductive portion extending in a longitudinal direction along which a supply current flows between the first supply terminal and the second supply terminal, the inductive portion comprising at least one notch defining a narrowing of a transverse cross-section of this inductive portion, perpendicularly to the longitudinal direction, the method comprising:

- a step of supplying the inductive portion with a supply current;
- a step of generating an electromagnetic field by the supply current flowing in the inductive portion;
- a step of inducing an induced current in the electrically conductive part by the electromagnetic field, and
- a step of deforming the portion of the electrically conductive part depending on a force of the electromagnetic field.

BRIEF DESCRIPTION OF THE DRAWINGS

The invention will be better understood upon reading the following description, given only by way of example, and made with reference to the appended drawings, among which.

DETAILED DESCRIPTION

Figure 1:
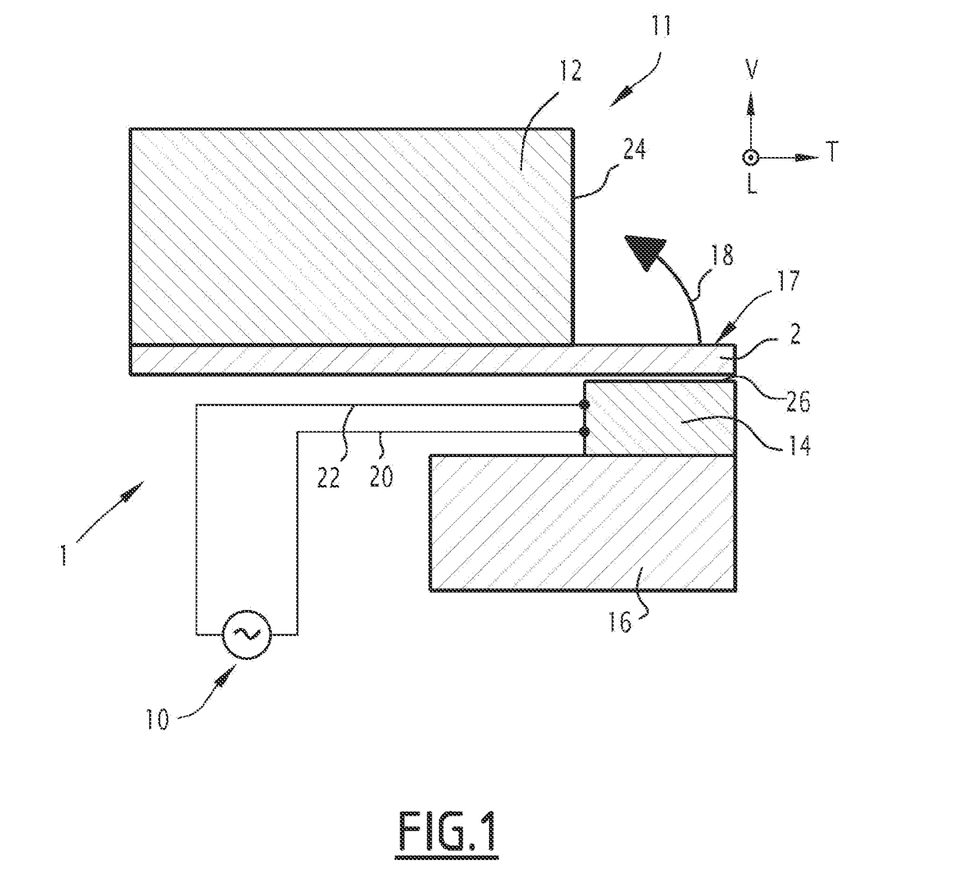
FIG. 1 is a schematic representation of a forming system comprising a forming device.

A forming system 1 for deforming an electrically conductive part 2 has been represented in FIG. 1. The forming system 1 comprises a power supply source 10 and a forming device 11 comprising a die 12, an inductor 14 and a support 16 configured to support the inductor 14.

The forming device 11 is configured to inductively deform a portion 17 of the part 2 along the direction of the arrow 18. According to the example in FIG. 1, the forming device 11 is configured to inductively fold the portion 17 toward the die 12.

According to one example, the inductor 14 is placed inside a support (not represented) fitted to the shape of the inductor 14. This prevents any deformation of the inductor 14 during use.

Figure 2:
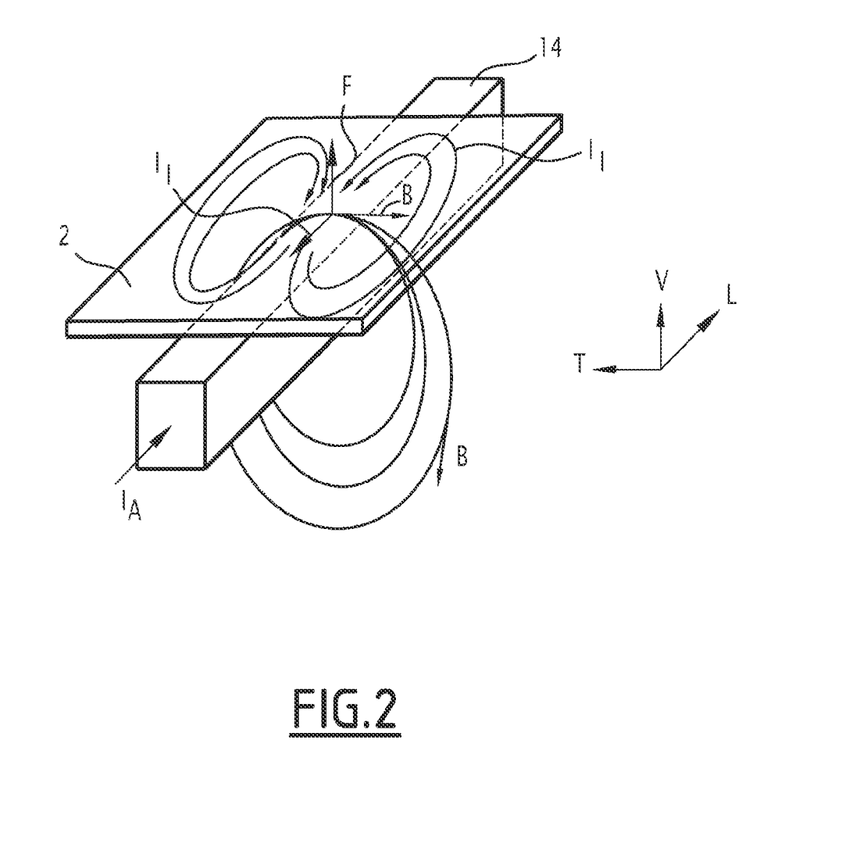
FIG. 2 is a schematic perspective representation of a portion of the forming system of FIG. 1 representing the principle of inductively forming a portion of an electrically conductive part.

The principle of induction forming is schematically represented in FIG. 2 showing an example of the inductor 14 on which the electrically conductive part 2 is disposed. The inductor 14 is likely to carry a supply current $I_A$ along a longitudinal direction L. During changes in the direction and intensity of the supply current $I_A$, an electromagnetic field is generated. The electromagnetic field dictates, in a manner known per se, a Lorentz force F onto the electrically conductive part 2.

In particular, as is visible in FIG. 2, changes in the supply current $I_A$ are likely to generate a magnetic field B, especially, a time-variable magnetic field B. The magnetic field B is likely to induce an induced current $I_I$ in the electrically conductive part 2, which generates the Lorentz force F likely to deform the electrically conductive part 2 along the direction of this Lorentz force F. As is visible in FIG. 2, the direction of the Lorentz force F at a defined point is perpendicular to the direction of the magnetic field B at this defined point and perpendicular to the direction of the induced current $I_I$ at this defined point.

In particular, the distribution of the Lorentz forces F in the electrically conductive part 2 directly depends on the flow of the induced currents $I_I$ in the electrically conductive part 2 and thus especially on the geometry of the inductor 14.

Referring again to FIG. 1, the power supply source 10 is configured to generate the supply current $I_A$. For example, the power supply source 10 is a current source configured to generate a current variable over time. In particular, the power supply 10 is configured to generate a sinusoidal current, especially a sinusoidal current with exponential damping.

The power supply source 10 is especially configured to generate currents having a high gradient, such as an energy discharge of one joule in 1 μs. The power supply source 10 comprises, for example, a capacitor (not represented) to be discharged upon inducing the supply current $I_A$.

The power supply 10 comprises a first supply connection 20 and a second supply connection 22 electrically connected to the inductor 14.

The die 12 of the forming device 11 is configured to form a stop for the electrically conductive part 2, especially upon deforming the portion 17 of the electrically conductive part 2. The die 12 is, for example, a metal block. The die 12 especially comprises a functional side 24 adapted to receive the deformed portion 17 of the electrically conductive part 2.

The inductor 14 is configured to be supplied with the supply current $I_A$ from the power supply 10. According to embodiments, the inductor 14 has different geometries (described below). The inductor comprises, for example, at least 90% steel.

The support 16 supports the inductor 14. The support 16, known per se, may be formed by any device suitable for holding the inductor 14.

Figure 3:
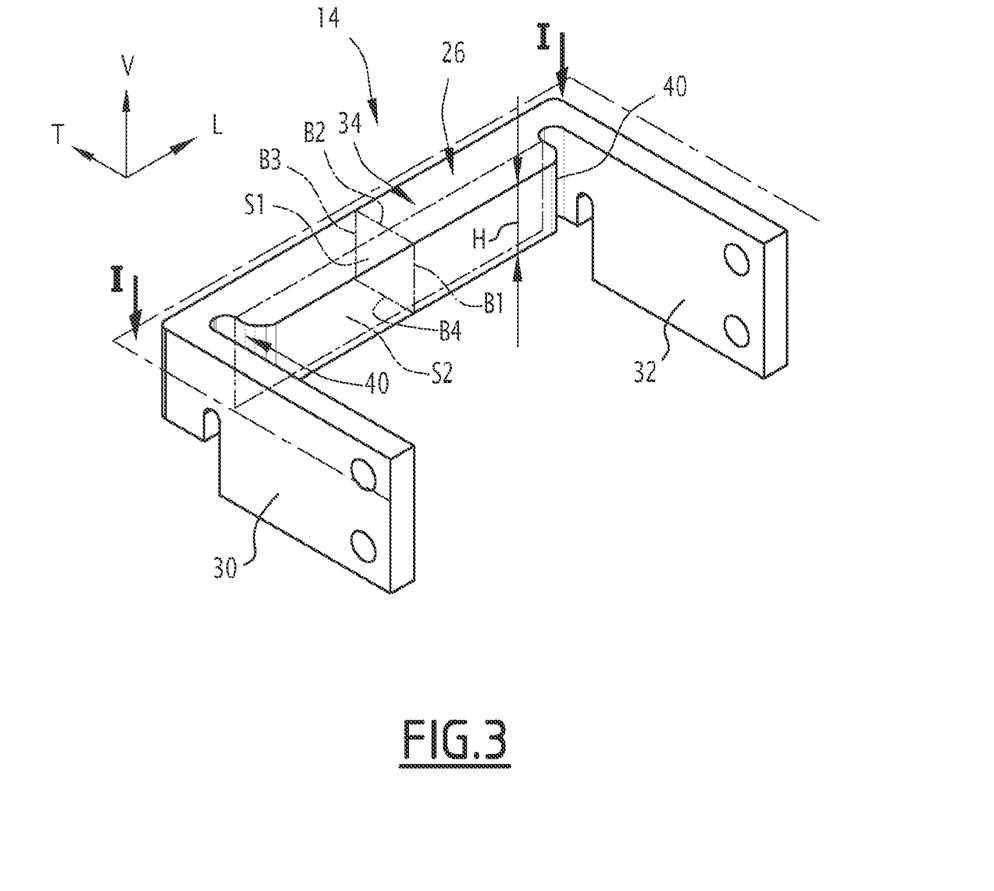
FIG. 3 is a schematic perspective representation of the forming device according to a first embodiment.
Figure 4:
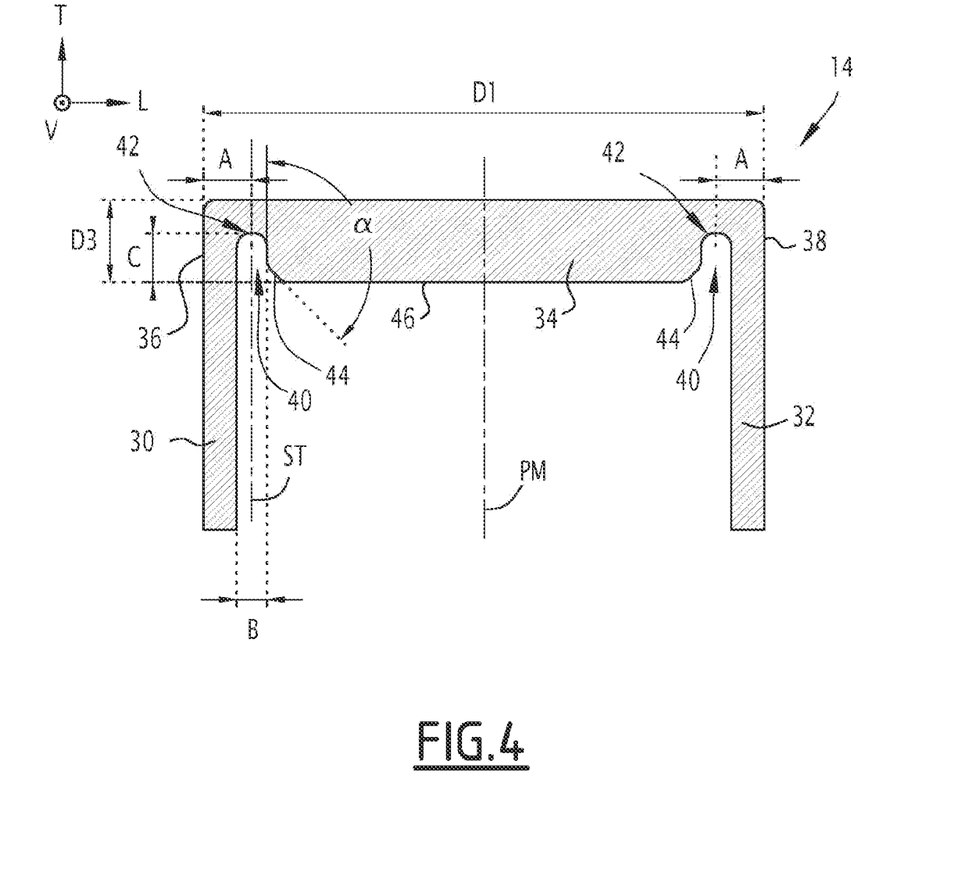
FIG. 4 is a schematic cross-sectional representation of the forming device of FIG. 3 along a plane I-I.

A first embodiment of the inductor 14 is represented in FIGS. 3 and 4.

For the inductor 14, a longitudinal direction L is defined, along which the supply current $I_A$ is likely to flow. A vertical direction V perpendicular to an upper surface 26 of the inductor 14 is also defined, the upper surface 26 being to support the electrically conductive part 2. The vertical direction V is perpendicularly to the longitudinal direction L. A transverse direction T perpendicular to the longitudinal direction L and perpendicular to the vertical direction V is also defined.

The inductor 14 comprises a first supply terminal 30, a second supply terminal 32 and at least one inductive portion 34 electrically connecting the first supply terminal 30 and the second supply terminal 32 to each other.

The first supply terminal 30 is electrically connected to the first supply connection 20, and the second supply terminal 32 is electrically connected to the second supply connection 22.

The inductive portion 34 is especially to induce the induced current $I_I$ in the electrically conductive part 2. The inductive portion 34 extends in the longitudinal direction L along which the supply current $I_A$ is to flow between the first supply terminal 30 and the second supply terminal 32.

Especially, the inductive portion 34 longitudinally extends between a first end 36 and a second end 38 (visible in particular in FIG. 4). The first end 36 is spaced by a first distance D1 from the second end 38 along the longitudinal direction L.

The inductive portion 34 comprises at least one notch 40. According to the examples of the figures, each inductive portion 34 comprises two notches 40.

According to alternatives, not represented, the inductive portion 34 comprises a single notch 40 or more than two notches.

Each notch 40 defines a narrowing of a transverse cross-section ST (visible in particular in FIG. 4) of the inductive portion 34. The transverse cross-section ST is perpendicularly to the longitudinal direction L and extends especially along the transverse direction T.

More particularly, each notch 40 extends, along the vertical direction V, over at least 90% of a height H (visible in particular in FIG. 3) of the inductive portion 34 extending along the vertical direction V. In the examples of FIGS. 3, 4, 6, 8, and 10, each notch 40 extends over the entire height H.

FIG. 4 is a cross-sectional view along a plane I-I extending along the longitudinal direction L and the transverse direction T.

As visible in particular in FIG. 4, each notch 40 is positioned at a second distance A from the first end 36 or the second end 38 of the inductive portion 34. The second distance A is for example lower than 20%, preferably lower than 10% and even more preferably substantially equal to 8% of the first distance D1.

Each notch 40 extends, along the longitudinal direction L, over a width B (visible in particular in FIG. 4). The width B is for example greater than 50% of the second distance A.

Each notch 40 extends, for example, along the transverse direction T, over a depth C (visible in particular in FIG. 4) of at least 40% of a transverse dimension D3 of the inductive portion 34, preferably of at least 50% and even more preferably substantially equal to 60% of the transverse dimension D3. By "transverse dimension", it is meant the maximum dimension of the inductive portion 34.

For example, the notch 40 has a bottom 42 having a surface having, in the plane I-I, a section of a circle having a radian R1 (not represented). The radian R1 is for example substantially equal to 2.5 mm.

The notch 40 has, for example, a chamfer 44 forming, in the plane I-I, an angle α with the transverse direction T, the chamfer 44 connecting the bottom 42 of the notch 40 with an internal edge 46 of the inductive portion 34. The angle α is between 100 degrees and 150 degrees, preferably substantially equal to 135 degrees.

According to the example of FIGS. 3 and 4, the notches 40 are symmetrical to each other with respect to a median plane PM of the inductive portion 34. The median plane PM is a plane extending along the transverse T and the vertical V directions, and is the same distance away from the first end 36 and the second end 38.

According to the example of FIGS. 3 and 4, the second distance A of the notch 40, the width B and the depth C of the notch 40 are chosen as follows:

A=8.75 mm;
B=5.5 mm, and
C=9 mm.

Figure 5:
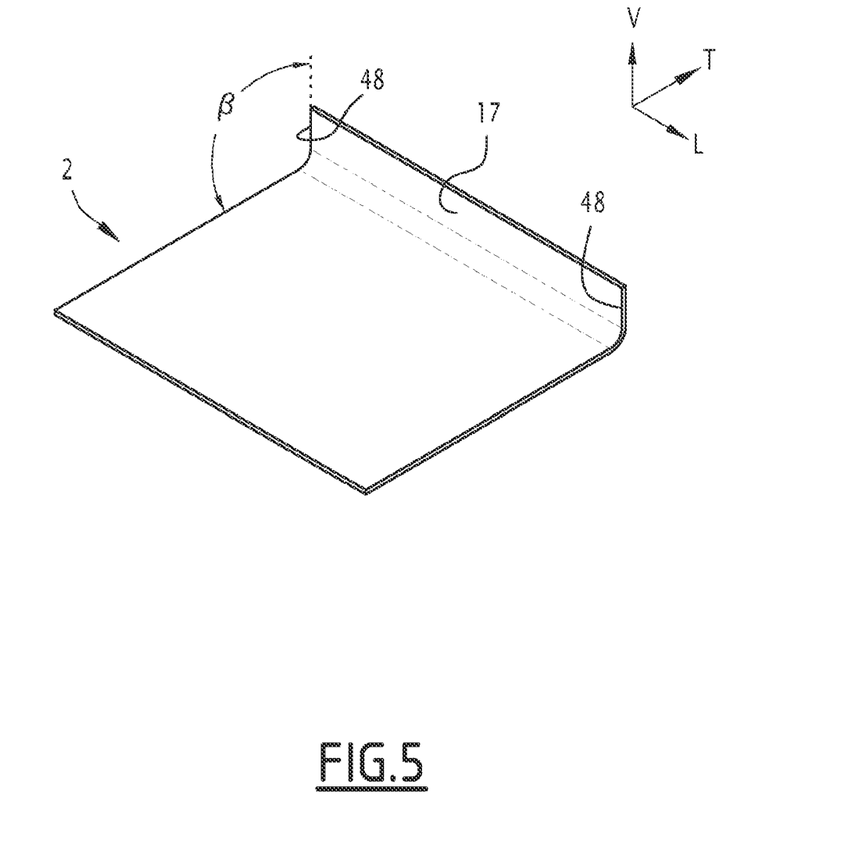
FIG. 5 is a schematic perspective representation of a part deformed by the forming device of FIG. 3.

Such a choice of parameters A, B and C makes it possible especially to obtain a homogeneous flanged edge of the electrically conductive part. By "homogeneous flanged edge" it is meant an edge having a bending angle β (visible in particular in FIG. 5) that is substantially constant along the longitudinal direction L.

Figure 6:
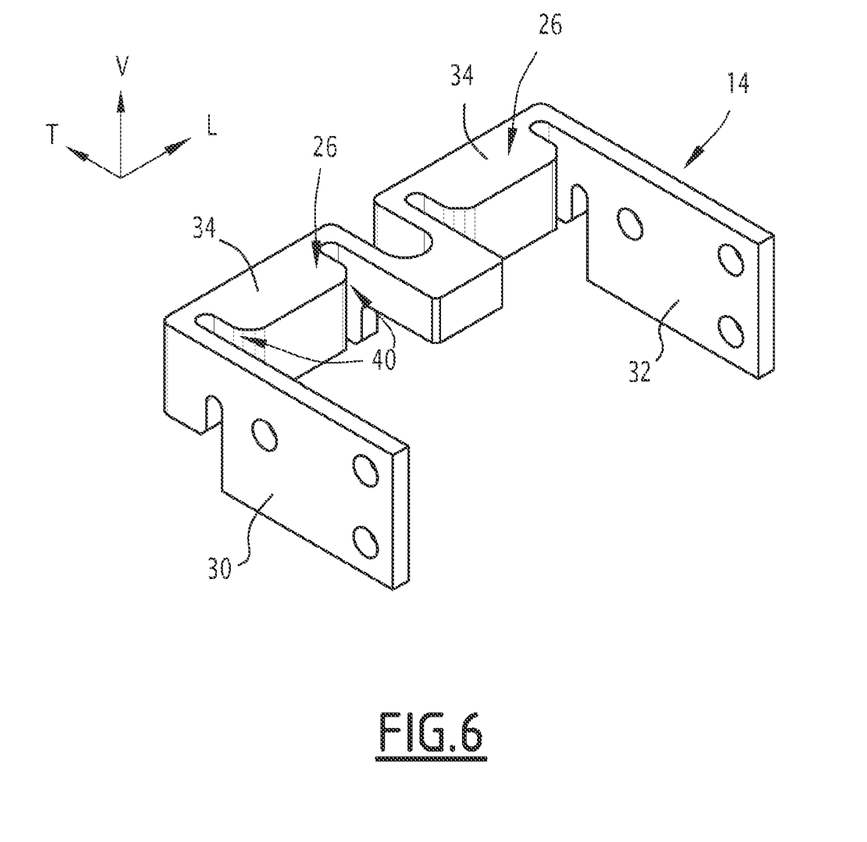
FIG. 6 is a schematic perspective representation of the forming device according to a second embodiment.
Figure 8:
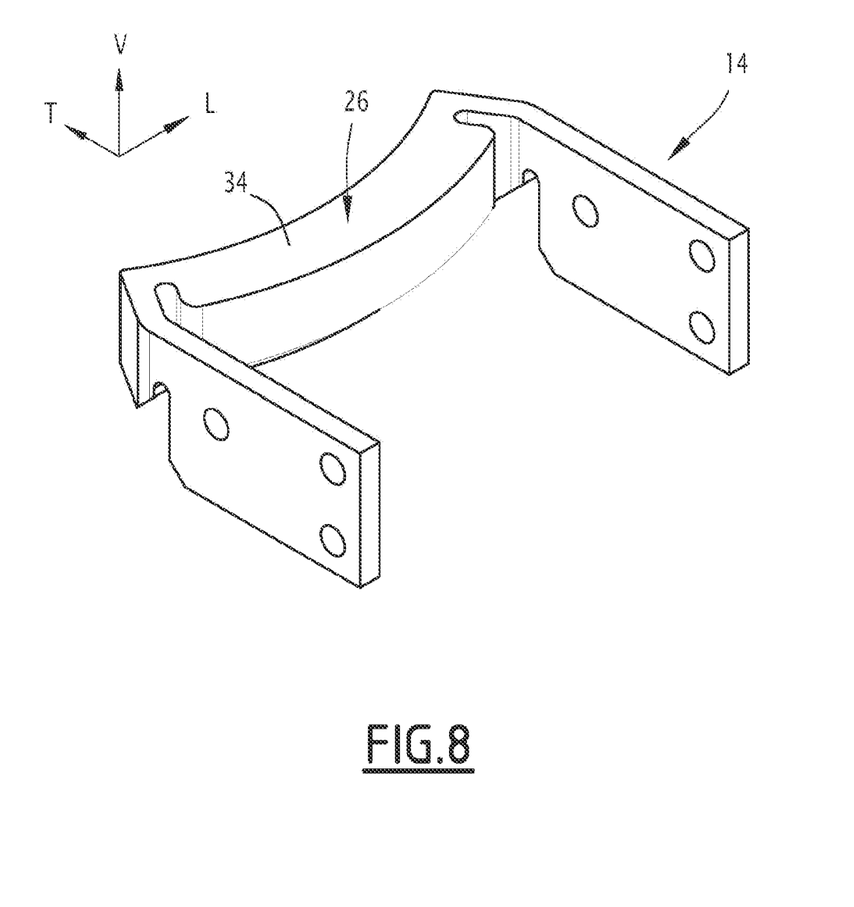
FIG. 8 is a schematic perspective representation of the forming device according to a third embodiment.
Figure 10:
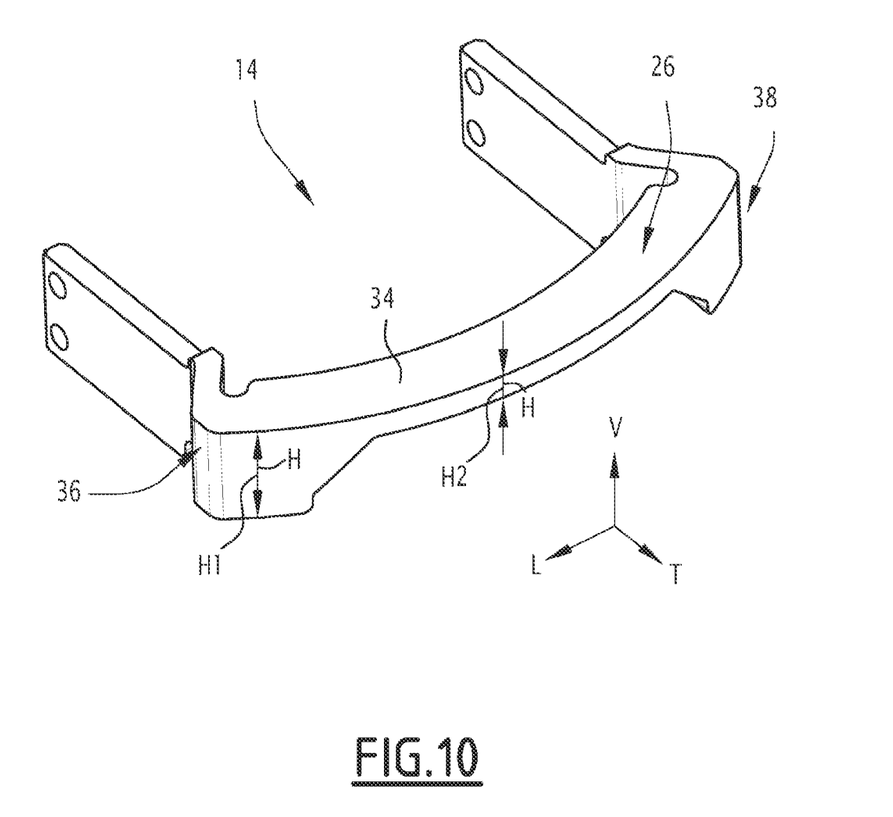
FIG. 10 is a schematic perspective representation of the forming device according to a fourth embodiment.

A second embodiment of the inductor 14, a third embodiment of the inductor 14, and a fourth embodiment are represented in FIG. 6, FIG. 8 and FIG. 10 respectively.

Identical elements between each embodiment and the first embodiment are not described again. Only differences from the first embodiment are highlighted hereafter. Identical elements are referred to by the same references as in the first embodiment.

According to the second embodiment (visible in FIG. 6), the inductor 14 comprises two inductive portions 34. Each inductive portion 34 comprises two notches 40. Both inductive portions 34 are connected in series between the first supply terminal 30 and the second supply terminal 32.

Figure 7:
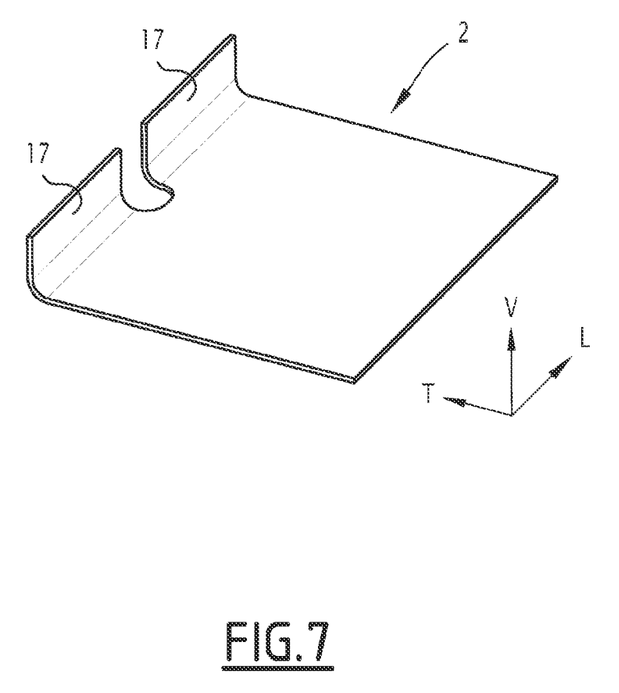
FIG. 7 is a schematic perspective representation of a part deformed by the forming device of FIG. 6.

The electrically conductive part 2 represented in FIG. 7 is deformed by the inductor 14 of FIG. 6. This electrically conductive part 2 comprises two inductively deformed portions 17 which are especially arranged in series along the longitudinal direction L.

According to the third embodiment (visible in FIG. 8), the inductive portion 34 has, in a plane extending along the longitudinal direction L and the transverse direction T, a curve connecting the first supply terminal 30 and the second supply terminal 32.

By "curve" it is meant a line devoid of a straight portion.

The curve is, for example, devoid of any inflection point and is continuously differentiable. By "continuously differentiable" it is meant that, when the curve is considered in the plane as a mathematical function, this function is differentiable at any point, the derivative itself being continuous.

Figure 9:
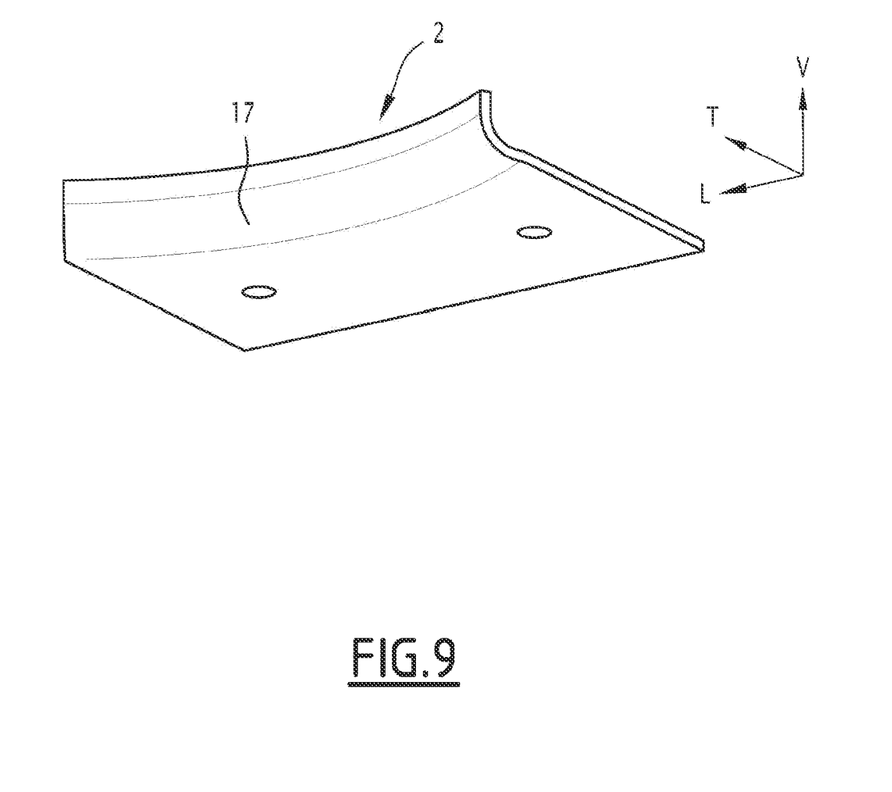
FIG. 9 is a schematic perspective representation of a part deformed by the forming device of FIG. 8.

The electrically conductive part 2 represented in FIG. 9 is deformed by the inductor 14 of FIG. 8. The electrically conductive part 2 comprises the inductively deformed portion 17 having a curve in the plane extending along the longitudinal direction L and the transverse direction T.

According to the fourth embodiment (visible in FIG. 10), the height H of the inductive portion 34 is variable along the longitudinal direction L. For example, the inductive portion 34 has a first height H1 and a second height H2, the second height H2 being strictly lower than the first height H1. Especially, the inductive portion 34 comprises the second height H2 in a central zone of the inductive portion 34 and the first height H1 in zones near the first end 36 and the second end 38 of the inductive portion 34.

Decreasing the height H in the central zone of the inductive portion 34 increases the induced current $I_i$ in the corresponding portion of the electrically conductive part 2.

Figure 11:
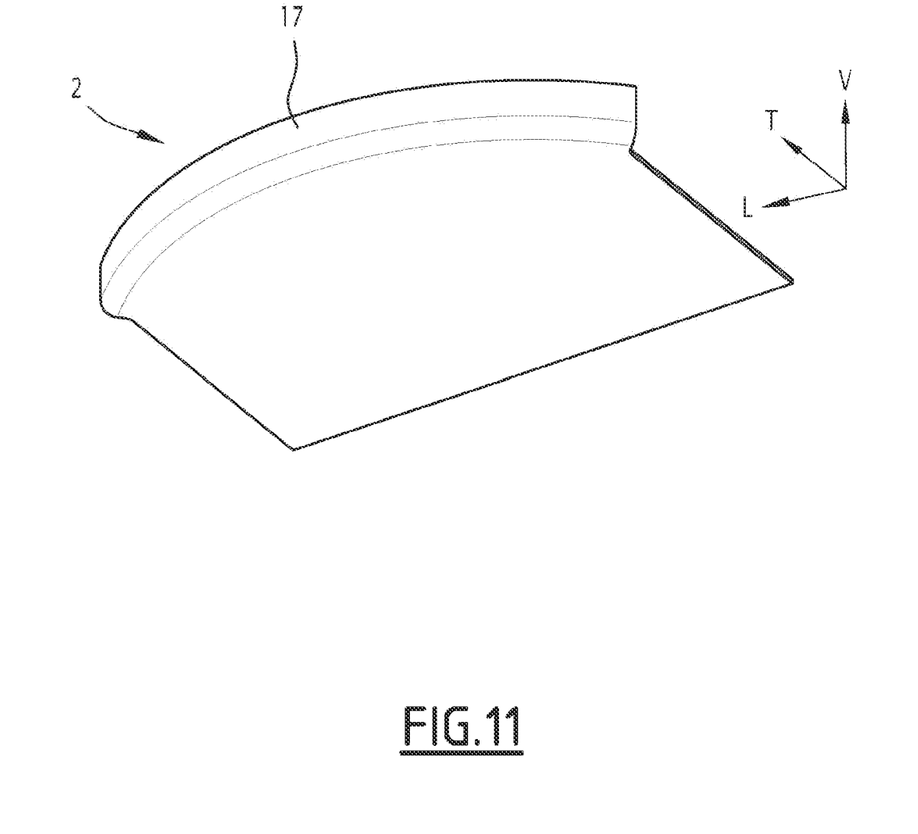
FIG. 11 is a schematic perspective representation of a part deformed by the forming device of FIG. 10.

The electrically conductive part 2 represented in FIG. 11 is deformed by the inductor 14 of FIG. 10. The portion 17 of this electrically conductive part 2 has a curve.

According to another example, not represented, the height H is variable along the transverse direction T.

According to another example not represented, the height is variable along the transverse direction T and along the longitudinal direction L.

As visible in the example of FIG. 3, the inductor 14 has transverse cross-sections S1 (parallel to the plane V,T) and longitudinal cross-sections S2 (parallel to the plane V,L).

Each transverse cross-section S1 has four edges B1, B2, B3 and B4. Each longitudinal cross-section also has four edges, not referenced for the sake of visibility.

It should be noted that the supply current $I_A$ flows in a skin of the inductor 14. For example, the supply current $I_A$ flowing through the transverse cross-section S1 flows on the four edges B1, B2, B3 and B4 of the transverse cross-section S1.

Strains across the width, along the transverse direction T, applied to the electrically conductive part 2, depend on the shape of the transverse cross-section S1. Similarly, strains across the length along the longitudinal direction L, applied to the electrically conductive part 2 depend on the shape of the longitudinal cross-section S2.

By varying the transverse cross-sections S1 and/or the longitudinal cross-sections S2, distribution in the strains applied to the electrically conductive part 2 is modified. Furthermore, varying the distance of the edges B1, B2, B3 and B4 from the electrically conductive part 2 allows the strain applied to the electrically conductive part 2 to be varied.

For example, if the electrically conductive part 2 has a large thickness (as viewed along the vertical direction V when the electrically conductive part 2 is not deformed), adapted transverse cross-sections S1 will be chosen to induce appropriate strains for deformation of the electrically conductive part 2.

For example, when the electrically conductive part 2 is positioned above the inductor 14 in FIG. 3 in parallel to the plane I-I, an end of the electrically conductive part 2 is located above the edge B3, and a bending zone of the electrically conductive part 2 is located above the edge B1. The transverse cross-section S1 is chosen to induce a higher strain in the end of the electrically conductive part 2 relative to the strain induced in the bending zone of the electrically conductive part 2, as is described in the following examples of variations.

According to a first example, the edge B2 of the transverse cross-section S1 is parallel to the plane I-I. The edge B4 forms an angle greater than 0 degree and lower than 90 degrees with a plane parallel to the plane I-I such that the distance between the edge B2 and the edge B4 decreases along the positive sense of the transverse direction V. Thus, the edge B4 has a higher distance to the bending zone of the electrically conductive part 2 as compared to the distance of the edge B4 to the end of the electrically conductive part 2. The magnetic field at a point depends on the distance to the source, the source being the current flowing through the edges B1 to B4. Due to the varying distance of the edge B4 to the electrically conductive part 2, the magnetic field in the end of the electrically conductive part 2 is increased. Thus, a higher strain is induced in the end as compared to a strain induced in the bending zone.

According to a second example, the edge B4 is parallel to the plane I-I. The edge B2 forms an angle greater than 0 degree and lower than 90 degrees with a plane parallel to the plane I-I so that the distance between the edge B2 and the edge B4 decreases along the positive sense of the transverse direction V. Thus, as in the first example, a higher strain is induced in the end as compared to a strain induced in the bending zone of the electrically conductive part 2.

Other examples of shapes of the transverse cross-section S1 and the longitudinal cross-section S2 are contemplatable, as well as a combination of the first and second examples.

According to alternatives, the inductor 14 comprises one of any combinations of the embodiments set forth where technically possible.

A method for deforming the portion 17 of the electrically conductive part 2 will now be described.

The method is implemented by the forming device 11.

The method comprises a supply step, an electromagnetic field generation step, an induction step and a deformation step.

In the supply step, the inductive portion 34 is supplied with the power source 10 generating the supply current $I_A$. The supply current $I_A$ thus flows through the inductive portion 34 between the first supply terminal 30 and the second supply terminal 32.

In the generation step, by changes in direction and intensity of the supply current $I_A$, the electromagnetic field is generated.

In the induction step, the electromagnetic field, especially the magnetic field B, induces the induced current $I_I$ in the electrically conductive part 2.

In the deformation step, the induced current $I_I$ generates the Lorentz force F. The electrically conductive part 2 is thus deformed along the direction of the arrow 18 (visible in FIG. 1). At the end of the method, the electrically conductive part 2 comprising the deformed portion(s) 17 is obtained, as for example represented in FIGS. 5, 7, 9, and 11.

The forming device 11 has several advantages.

The forming device 11 as described above makes it possible to achieve better deformation of electrically conductive parts and keep the forming time short.

Indeed, by virtue of the notches 40, the induced current $I_I$ in the electrically conductive part 2 is better distributed. In particular, the induced current $I_I$ in ends of the deformed portions 17, or flanged edges, is increased, thereby also deforming these ends.

In particular, the inductor 14 having the notches 40 allows strains to be induced in corners of the electrically conductive part 2.

The choice of the parameters of the second distance A of the notch 40, the width B and the depth C of the notch 40 can especially influence a distribution in the induced current $I_I$ in the electrically conductive part 2 in such a way that an optimized distribution is achieved. For example, an increase in the depth C allows an increase in the induced current $I_I$ in the ends of the electrically conductive part 2.

A reduction in the second distance A also allows an increase in the induced current $I_1$ in ends 48 (visible in particular in FIG. 5) of the portion 17 of the electrically conductive part 2.

Accordingly, by virtue of the inductors 14 as described, it is possible to obtain a wide variety of parts 2 deformed according to the shapes of the inductors 14, and to obtain in particular uniform edges.

Further, the forming device 11 is easily adaptable, for example, depending on a thickness of the electrically conductive part 2 or depending on a conductivity of the electrically conductive part 2, in order to achieve a distribution in the desired induced current $I_I$.

The invention claimed is:

1. An induction forming device, comprising
an inductor configured to inductively deform a portion of an electrically conductive part, the inductor comprising a first supply terminal, a second supply terminal and at least one inductive portion electrically connecting the first supply terminal and the second supply terminal to each other, the at least one inductive portion configured to induce an induced current in the electrically conductive part,
the at least one inductive portion extending in a longitudinal direction from a first end to a second end thereof, and in between the first supply terminal and the second supply terminal, such that a supply current is configured to flow between the first supply terminal and the second supply terminal,
wherein the at least one inductive portion comprises an upper surface, an internal edge in between the first supply terminal and the second supply terminal, and at least one notch extending into the internal edge of the at least one inductive portion, and the at least one notch comprises a depth along a transverse cross-section of the at least one inductive portion, defining a narrowing of a transverse dimension of the upper surface of the at least one inductive portion along the transverse cross-section of the at least one inductive portion, perpendicularly to the longitudinal direction.

2. The induction forming device according to claim 1, wherein:
the first end is spaced by a first distance from the second end,
the at least one notch is positioned at a second distance from the first end or the second end, the second distance being lower than 20% of the first distance.

3. The induction forming device according to claim 1, wherein the depth of the at least one notch extends, transversely to the longitudinal direction, to at least 40% of the transverse dimension of the at least one inductive portion.

4. The induction forming device according to claim 1, wherein the at least one notch of the at least one inductive portion comprises at least two notches.

5. The induction forming device according to claim 4, wherein the at least two notches are symmetrical to each other with respect to a median plane of the at least one inductive portion.

6. The induction forming device according to claim 1, wherein the at least one inductive portion has a height extending along a vertical direction perpendicular to the upper surface, the upper surface being for supporting the electrically conductive part, the height being variable along the longitudinal direction.

7. The induction forming device according to claim 6, wherein the height is variable along a transverse direction perpendicularly to the longitudinal direction and to the vertical direction.

8. The induction forming device according to claim 1, wherein the at least one inductive portion of the inductor comprises at least two inductive portions, connected in series.

9. The induction forming device according to claim 1, comprising:
a support configured to hold the inductor; and
a die for forming a stop for the electrically conductive part.

10. A method for deforming a portion of an electrically conductive part, the method being implemented by an induction forming device comprising an inductor configured to inductively deform a portion of an electrically conductive part, the inductor comprising a first supply terminal, a second supply terminal and at least one inductive portion electrically connecting the first supply terminal and the second supply terminal to each other, the at least one inductive portion extending in a longitudinal direction from a first end to a second end thereof, and in between the first supply terminal and the second supply terminal, such that a supply current flows between the first supply terminal and the second supply terminal, the at least one inductive portion comprising an upper surface, an internal edge in between the first supply terminal and the second supply terminal, and at least one notch extending into the internal edge of the at least one inductive portion, and the at least one notch comprises a depth along a transverse cross-section of the at least one inductive portion, defining a narrowing of a transverse dimension of the upper surface of the at least one inductive portion along the transverse cross-section of the at least one inductive portion, perpendicularly to the longitudinal direction,
the method comprising:
a step of supplying the at least one inductive portion with the supply current;
a step of generating an electromagnetic field by the supply current flowing in the at least one inductive portion; and
a step of inducing an induced current in the electrically conductive part by the electromagnetic field, and
a step of deforming the portion of the electrically conductive part depending on a force of the electromagnetic field.

11. An induction forming device, comprising:
an inductor configured to inductively deform a portion of an electrically conductive part, the inductor comprising:
a first supply terminal, a second supply terminal and an inductive portion electrically connecting the first supply terminal and the second supply terminal to one another,
the inductive portion, which is structured to induce an induced current in the electrically conductive part, having a body that extends in a longitudinal direction along which a supply current is to flow between the first supply terminal and the second supply terminal,
wherein the inductive portion comprises an upper surface, an internal edge in between the first supply terminal and the second supply terminal, and a notch extending into the internal edge of the inductive portion, and the notch comprises a depth along a transverse cross-section of the inductive portion, defining a narrowing of the body in a transverse dimension of the upper surface of the inductive portion along the transverse cross-section, perpendicularly to the longitudinal direction.

12. The induction forming device of claim 11, wherein the notch is a first notch and is located at a first end of the body.

13. The induction forming device of claim 12, further comprising a second notch located at a second end of the body.

14. The induction forming device of claim 13, wherein the body has a first surface and an opposed second surface which is the internal edge, and wherein the first notch and the second notch are formed at the second surface.

15. The induction forming device of claim 14, wherein the first and second supply terminals extend radially from a respective position adjacent the first notch and second notch.

16. The induction forming device of claim 11, wherein the body has a width in a traverse direction of the longitudinal direction, and wherein each of the first and second supply terminals has a width with a greater dimension than the width of the body.

* * * * *